United States Patent
Dietz et al.

[11] Patent Number: 5,980,608
[45] Date of Patent: Nov. 9, 1999

[54] THROUGHFLOW GAS STORAGE AND DISPENSING SYSTEM

[75] Inventors: James Dietz; James V. McManus, both of Danbury, Conn.

[73] Assignee: Advanced Technology Materials, Inc., Danbury, Conn.

[21] Appl. No.: 09/003,611

[22] Filed: Jan. 7, 1998

[51] Int. Cl.$^6$ .................................................. B01D 53/04
[52] U.S. Cl. .................................. 95/12; 95/104; 95/133; 96/111; 96/115; 96/144
[58] Field of Search .................................. 95/97–99, 104, 95/105, 133, 8, 12, 23; 96/108, 144, 109, 111, 113, 115

[56] References Cited

U.S. PATENT DOCUMENTS

| | | | |
|---|---|---|---|
| 240,423 | 4/1881 | James ................................... | 206/0.7 X |
| 1,608,155 | 11/1926 | Barnebey .............................. | 206/0.7 X |
| 1,714,245 | 5/1929 | Schaefer ................................ | 96/146 X |
| 2,356,334 | 8/1944 | Maude et al. ......................... | 206/0.7 X |
| 2,450,289 | 9/1948 | Marek ................................... | 96/146 X |
| 2,663,626 | 12/1953 | Spangler ............................... | 206/0.7 X |
| 2,987,139 | 6/1961 | Bush .......................................... | 95/133 |
| 2,997,371 | 8/1961 | Wadsworth et al. .................. | 95/131 X |
| 3,006,153 | 10/1961 | Cook .................................... | 206/0.7 X |
| 3,080,307 | 3/1963 | Rinald ................................... | 96/127 X |
| 3,093,564 | 6/1963 | Weisman et al. ..................... | 96/127 X |
| 3,116,132 | 12/1963 | Haller et al. .......................... | 95/132 X |
| 3,144,200 | 8/1964 | Taylor et al. ......................... | 96/108 X |
| 3,176,444 | 4/1965 | Kiyonaga ................................ | 95/97 X |
| 3,264,803 | 8/1966 | Read .................................... | 96/146 X |
| 3,287,432 | 11/1966 | Sensel ........................................ | 95/95 |
| 3,415,069 | 12/1968 | Hauser ................................... | 96/126 X |
| 3,469,375 | 9/1969 | Barrington et al. ................... | 96/146 X |
| 3,675,392 | 7/1972 | Reighter ...................................... | 95/96 |
| 3,713,273 | 1/1973 | Coffee ................................... | 96/128 X |
| 3,719,026 | 3/1973 | Sand ..................................... | 95/106 |
| 3,788,036 | 1/1974 | Lee et al. .............................. | 96/130 X |
| 4,023,701 | 5/1977 | Dockery ................................ | 206/0.7 X |
| 4,168,149 | 9/1979 | Armond et al. ....................... | 95/96 X |
| 4,263,018 | 4/1981 | McCombs et al. ................... | 96/130 X |

(List continued on next page.)

FOREIGN PATENT DOCUMENTS

| | | | |
|---|---|---|---|
| 1095796 | 12/1960 | Germany ............................... | 95/133 |
| 2264512 | 3/1971 | Germany ............................... | 95/133 |
| 3139-781 | 10/1981 | Germany ............................... | 96/122 |
| 52-72373 | 12/1975 | Japan ..................................... | 96/130 |
| 61-133116 | 6/1986 | Japan ..................................... | 96/126 |
| 63-88017 | 10/1986 | Japan ..................................... | 96/121 |
| 3-127606 | 10/1989 | Japan ..................................... | 96/108 |
| 1583151A1 | 5/1988 | U.S.S.R. ................................ | 95/133 |
| 1544475A1 | 2/1990 | U.S.S.R. ................................ | 95/131 |
| 1181692 | 9/1995 | U.S.S.R. ................................ | 95/133 |

OTHER PUBLICATIONS

"Beaded Carbon UPS Solvent Recovery," Chemical Engineering, vol. 84, No. 18 pp. 39–40, Aug. 29, 1977.

*Primary Examiner*—Robert Spitzer
*Attorney, Agent, or Firm*—Steven J. Hultquist; Oliver A.M. Zitzmann

[57] ABSTRACT

An apparatus for storage and dispensing of a gas, comprising a gas storage and dispensing vessel holding a physical sorbent medium and gas adsorbed on the physical sorbent medium, wherein a carrier gas, e.g., helium, hydrogen, argon, etc., is flowed through the vessel to effect desorption of the sorbate gas and entrainment of the desorbed gas in the carrier gas stream. The storage and dispensing system of the invention may be employed to provide the dispensed sorbate gas to a downstream locus of use in applications such as epitaxial film formation and ion implantation, in the manufacture of semiconductor devices.

62 Claims, 2 Drawing Sheets

U.S. PATENT DOCUMENTS

| | | | |
|---|---|---|---|
| 4,343,770 | 8/1982 | Simons | 206/0.7 X |
| 4,414,005 | 11/1983 | DeBiévre et al. | 95/127 |
| 4,477,265 | 10/1984 | Kumar et al. | 95/96 X |
| 4,552,571 | 11/1985 | Dechene | 95/96 X |
| 4,578,256 | 3/1986 | Nishino et al. | 95/133 X |
| 4,673,415 | 6/1987 | Stanford | 95/96 X |
| 4,723,967 | 2/1988 | Tom | 96/108 X |
| 4,738,693 | 4/1988 | Tom | 96/108 X |
| 4,738,694 | 4/1988 | Godino et al. | 96/126 X |
| 4,744,221 | 5/1988 | Knollmueller | 62/48 |
| 4,749,384 | 6/1988 | Nowobilski et al. | 55/27 |
| 4,761,395 | 8/1988 | Tom et al. | 502/401 |
| 4,869,733 | 9/1989 | Stanford | 95/96 X |
| 4,881,958 | 11/1989 | Eckardt et al. | 96/127 |
| 5,051,117 | 9/1991 | Prigge et al. | 95/95 |
| 5,089,244 | 2/1992 | Parent et al. | 95/133 X |
| 5,114,440 | 5/1992 | Reiss | 95/96 |
| 5,133,787 | 7/1992 | Diot et al. | 96/121 |
| 5,151,395 | 9/1992 | Tom | 502/67 |
| 5,202,096 | 4/1993 | Jain | 96/126 X |
| 5,224,350 | 7/1993 | Mehra | 95/96 X |
| 5,238,469 | 8/1993 | Briesacher et al. | 96/126 X |
| 5,294,246 | 3/1994 | Gardner, Sr. | 95/97 X |
| 5,385,689 | 1/1995 | Tom et al. | 252/194 |
| 5,409,526 | 4/1995 | Zheng et al. | 96/132 |
| 5,417,742 | 5/1995 | Tamhankar et al. | 95/96 |
| 5,518,528 | 5/1996 | Tom et al. | 95/103 |
| 5,704,965 | 1/1998 | Tom et al. | 95/133 X |
| 5,837,027 | 11/1998 | Olander et al. | 95/104 X |

FIG. 1

FIG.2

THROUGHFLOW GAS STORAGE AND DISPENSING SYSTEM

BACKGROUND OF THE INVENTION

1. Field of the Invention

This invention relates generally to storage and dispensing systems for the selective dispensing of fluids from a vessel in which the fluid component(s) are sorptively retained by a sorbent medium, and are desorptively released from the sorbent medium in the dispensing operation. More specifically, the invention relates to such type of storage and dispensing system from which the sorbate fluid is supplied by flow of carrier gas through the storage and dispensing system during the dispensing operation.

2. Description of the Related Art

In a wide variety of industrial processes and applications, there is a need for a reliable source of process fluid(s), which is compact, portable, and available to supply the fluid(s) on demand. Such processes and applications include semiconductor manufacturing, ion implantation, manufacture of flat panel displays, medical treatment, water treatment, emergency breathing systems, welding operations, space-based applications involving dispensing of liquids and gases, etc.

U.S. Pat. No. 4,744,221 issued May 17, 1988 to Karl O. Knollmueller discloses a method of storing and subsequently delivering arsine, by contacting arsine at a temperature in the range of from about −30° C. to about ±30° C. with a zeolite of pore size in the range of from about 5 to about 15 Angstroms to adsorb arsine on the zeolite, and then dispensing the arsine by heating the zeolite to an elevated temperature of up to about 175° C. for sufficient time to release the arsine from the zeolite material. Knollmueller utilizes thermal desorption to effect dispensing of the arsine at elevated pressures. An optical sensor or spectrophotometer is described in the patent as being used to monitor arsine concentrations. The Knollmueller system operates at pressures that are >15 psig and at temperatures in excess of 60° C. to dispense arsine at concentrations of 15–60% by volume.

U.S. Pat. No. 5,518,528 issued May 21, 1996 in the names of Glenn M. Tom and James V. McManus, describes a gas storage and dispensing system, for the storage and dispensing of gases, e.g., hydride gases, halide gases, organometallic Group V compounds, etc., which overcomes various disadvantages of the gas supply process disclosed in the Knollmueller patent.

The gas storage and dispensing system of the TQm et al. patent comprises an adsorption-desorption apparatus, for storage and dispensing of gases, including a storage and dispensing vessel holding a solid-phase physical sorbent medium, and arranged for selectively flowing gas into and out of the vessel. A sorbate gas is physically adsorbed on the sorbent medium. A dispensing assembly is coupled in gas flow communication with the storage and dispensing vessel, and provides, exteriorly of the vessel, a pressure below the vessel's interior pressure, to effect desorption of sorbate gas from the solid-phase physical sorbent medium, and flow of desorbed gas through the dispensing assembly. Heating means may be employed to augment the desorption process, but it is preferred to operate the Tom et al. system with the desorption being carried out at least partially by pressure differential-mediated release of the gas from the sorbent medium.

The storage and dispensing system of the Tom et al. patent embodies a substantial advance in the art, relative to the prior art use of high pressure gas cylinders. Conventional high pressure gas cylinders are susceptible to leakage from damaged or malfunctioning regulator assemblies, as well as to rupture and unwanted bulk release of gas from the cylinder if the internal gas pressure in the cylinder exceeds permissible limits. Such over-pressure may for example derive from internal decomposition of the gas leading to rapid increasing interior gas pressure in the cylinder.

The fluid storage and dispensing system of the Tom et al. patent thus reduces the pressure of stored sorbate gases by reversibly adsorbing them onto a sorbent medium, e.g., a zeolite or activated carbon material.

A fluid storage and dispensing system of the general type disclosed in the Tom et al. patent, hereafter referred to as an "FSDS," is commonly used in association with low pressure end use applications, such as ion imnplantation in semiconductor manufacturing processes, that provide a pressure differential, ΔP, between the near-ambient interior pressure of the storage and dispensing vessel, $P_{FSDS}$, and the low pressure of the downstream process in which the dispensed fluid is used, $P_{use}$. The near-ambient pressure of the FSDS vessel's interior volume may for example be on the order of 600 to 800 torr, and the pressure of the downstream process may for example be below 500 torr.

In these low pressure applications, the pressure differential, $\Delta P = P_{FSDS} - P_{use}$, is favorable for extracting the sorbate fluid from the FSDS vessel, including the fluid in the head space and in the interstices of the bed of sorbent material (typically present as a bed of particulate, pelletized, bead, granular or other finely divided material having affinity for the sorbate gas species of interest), as well as effecting desorption of the sorbate fluid from the sorbent material by virtue of the pressure differential.

Difficulties arise, however, in dispensing fluid from an FSDS when the pressure level of the downstream process is at atmospheric or slightly below atmospheric pressure, and the pressure differential, $\Delta P = P_{FSDS} - P_{use}$, is very low. In many instances, this pressure differential driving force (for mass transfer of the sorbate gas from the sorbent material into the surrounding gas phase of lower concentration of the sorbate species) is by itself inadequate to achieve the desired rate of dispensing of the sorbate gas.

Under such atmospheric or near-atmospheric dispensing conditions, therefore, there exists little or no driving force for mass transfer, i.e., there is little or no pressure gradient for achieving release of the sorbate fluid from the sorbent medium. As a result, only low or even minimal mass transfer of the sorbate gas may be possible. This is true for sub-atmospheric pressure processes, such as chemical vapor deposition (CVD) of tetraethylorthosilocate (TEOS), and is especially true in applications such as silicon epitaxy and other processes operating at atmospheric pressure.

An alternative means of achieving the desired desorption is the use of heat inputted to the sorbent material to mediate thermal desorption. Heating of the sorbent material in the storage and dispensing vessel of the FSDS shifts the equilibrium isotherm of the sorbent material so that the sorptive capacity of the sorbent material for the sorbate fluid is reduced. This in turn facilitates the desorption of the sorbate fluid from the sorbent material as the sorbent material is heated.

At the same time, however, the sorbent material has a finite heat capacity, and this "thermal mass" prevents the sorbent material from being instantly cooled when the input of heat is terminated at the fmish of the dispensing operation. As a result, even though the dispensing of the sorbate fluid has been concluded, fluid continues to desorb from the hot sorbent material and remain in the desorbed state, causing an overpressure in the FSDS vessel. Such pressure increase is at odds with the desired low pressure condition for the FSDS vessel interior volume, and the pressure increase may with significant heating create a hazardous high pressure level in the FSDS vessel.

It is an object of the present invention to provide an improved fluid storage and dispensing apparatus and method which overcome the aforementioned difficulties of the prior art.

It is another object of the present invention to provide an improved fluid storage and delivery system which utilizes little or no heating to supply the sorbate fluid for downstream applications which are at atmospheric pressure or above-atmospheric pressure levels.

It is a further object of the present invention to provide an improved means of controlling the dispensing flow rate and concentration of sorbatel fluid from a fluid storage and dispensing system.

Other objects and advantages of the invention will be more fully apparent from the ensuing disclosure and appended claims.

SUMMARY OF THE INVENTION

The present invention relates to a system for the dispensing of a sorbate fluid, e.g., a gas or vapor, from a fluid storage and dispensing system, comprising a sorbate fluid storage and dispensing vessel constructed and arranged to hold a solid-phase physical sorbent medium having a sorptive affinity for the sorbate fluid, and for selectively flowing sorbate fluid into and out of such vessel. A solid-phase physical sorbent medium having a sorptive affinity for the fluid is disposed in the storage and dispensing vessel at an interior fluid pressure. The sorbate fluid is physically adsorbed on the sorbent medium. A dispensing assembly is coupled in gas flow communication with the storage and dispensing vessel, for discharging desorbed fluid from the vessel. The present invention facilitates the dispensing of the sorbate fluid by coupling a carrier gas source to the sorbate fluid gas vessel in gas flow communication with the sorbate fluid vessel. The carrier gas source is constructed and arranged for flowing carrier gas on demand into the vessel for uptake of the sorbate fluid in the carrier gas to yield a sorbate fluid-containing carrier gas, and discharge of the sorbate fluid-containing carrier gas from the vessel to the dispensing assembly for discharge from the system.

The invention relates in one aspect to a system for the storage and on-demand dispensing of a fluid that is physically sorbable on a selected physical sorbent and that subsequent to sorption is desorbable from the sorbent by a concentration gradient mass transfer driving force, with means for selectively flowing a carrier gas through the sorbate gas vessel to take up and entrain sorbable fluid held in the vessel in association with the sorbent medium, i.e., as physically adsorbed fluid on the surface and interior porosity of the sorbent medium, or as interstitial fluid in the void spaces of the sorbent medium bed held in the vessel, or as fluid held in the head space of the vessel, above the bed of the sorbent medium (typically provided as a particulate or other finely divided material).

A specific embodiment of the invention effects the diffusional release of sorbate gas from the adsorbent medium to the bulk gas phase by creation of an enhanced concentration gradient within the vessel between the sorbent medium and the fluid phase per se.

As used in such context, the term "enhanced" in reference to the concentration gradient achieved with use of a carrier gas in accordance with the present invention, means that the concentration gradient for mass transfer from the sorbent material to the gas phase environment of such sorbent material is quantitatively increased in relation to the concentration gradient present in a corresponding fluid storage and dispensing system lacking the carrier gas throughflow feature of the present invention.

Under static conditions, an equilibrium exists in the interior volume of the storage and dispensing vessel containing the sorbent medium holding the sorbable fluid. This equilibrium is defined by the isotherm of the sorbent medium for such sorbable fluid, at the temperature of the sorbent medium in the vessel. However, when an inert gas or other suitable carrier gas is passed through the FSDS, dynamic conditions are created whereby sorbate gas molecules are released from the adsorbent material to the bulk gas phase. Under such conditions, the introduction of the carrier gas through the FSDS induces a concentration gradient between the adsorbent and the bulk gas phase, resulting in a diffusional release of the sorbate fluid to the free fluid phase.

Although the invention is described herein primarily with reference to a gas as the sorbate fluid, it will be recognized that the invention is broadly applicable to liquids, gases, vapors, and multiphase fluids, and contemplates storage and dispensing of fluid mixtures as well as single component fluids.

The carrier gas source may be introduced into the FSDS through appropriate piping, tubing, conduits, channels, or other suitable flow passage means, connected to a port or inlet of the sorbate fluid dispensing vessel. A port may for example be located at the lower end of the sorbate fluid dispensing vessel in spaced relationship to the the main dispensing vessel valve, so as to prevent or minimize the occurrence of carrier gas short-circuiting, bypassing, or other anomalous flow behavior.

The carrier gas is introduced through the port or inlet into the sorbate fluid-containing vessel, and may be flowed through the sorbent medium to maximize the uptake (pickup) of sorbate fluid from the sorbent in the vessel, for subsequent discharge from the vessel into the discharge means associated with the vessel, such as piping, manifolding, or other flow discharge means, associated with a discharge port or outlet of the vessel. For example the vessel may take the form of a conventional gas cylinder, with an opening at its upper end, to which a valve head assembly is leak-tightly joined, to provide egress of fluid from the cylinder in a well-known manner.

The present invention in a specific aspect contemplates the provision of a storage and dispensing system of the type more fully described in U.S. Pat. No. 5,518,528 and U.S. patent application Ser. Nos. 08/650,634 filed May 20, 1996 in the names of Glenn M. Tom and James V. McManus for "FLUID STORAGE AND DISPENSING SYSTEM UTILIZING CARBON SORBENT MEDIUM," the disclosures of which hereby are incorporated herein by reference in their entireties, wherein the storage and dispensing vessel is modified (relative to the vessel constructions shown and described in such prior patent and application) for the selective flowing of a carrier gas through the vessel, to provide a sustained high flow rate dispensing of fluid desorptively extracted from the sorbent in the storage and dispensing vessel of the system.

The source of carrier gas in a specific embodiment may usefully comprise a supply tank of the carrier gas, optionally having flow control means operatively coupled therewith, with associated piping, to flow the carrier gas on demand from the supply tank, at a rate determined by the flow control means when provided, to the vessel containing the sorbate fluid and the sorbent media.

The flow control means may comprise any suitable means for regulating the flow of the carrier gas into and through the vessel, such as for example: a flow valve; a mass flow controller; a cycle timer or metering assembly; a valved manifold coupled to a multiplicity of carrier gas components for make-up of a multicomponent carrier gas; a selectively actuatable bypass piping arrangement, a valve head regulator assembly on a pressurized cylinder of carrier gas; etc.

The flow control means may comprise or be associated with an automatic control system, including for example a microprocessor, microcontroller, computer or microelectronic circuitry, for supplying the carrier gas to the vessel holding the sorbent and fluid to be dispensed, to effect dispensing of the sorbable fluid from the storage and dispensing vessel at a rate and/or in an amount which is determined or controlled by process conditions (e.g., pressure, temperature, composition of the downstream carrier gas and desorbed fluid, rate of desorption of the sorbable fluid from the sorbent in the storage and dispensing vessel, concentration gradients, comparison of sorbate gas concentrations with a setpoint concentration value, etc.). Employment of a sorbate gas analyzer or other appropriate monitoring means may be appropriate for determining desorption rates and sorbate concentration levels.

As the carrier gas, which may for example comprise a gas such as hydrogen, argon, helium, nitrogen or any other suitable gas species, including multicomponent gas mixtures as well as single component carrier gas species, is flowed through the vessel of the FSDS, there is produced a mass flux (flow of molecules per area) of sorbate gas into the bulk fluid phase comprising the carrier gas stream. Such mass flux of the sorbable fluid into the carrier gas will depend on the specific sorptive affinity of the sorbent medium for the sorbable fluid (binding affinity), as well as process conditions, including carrier gas volumetric flow, temperature and pressure.

The process conditions desirable for dispensing of the sorbable gas in a given application will therefore be readily determinable by the skilled artisan, by the expedient of varying the process conditions associated with a given sorbent material and sorbable fluid, and determining the resulting concentration of the sorbable fluid in the resulting sorbable fluid-containing carrier gas stream.

In the practice of the invention, the flow of the carrier gas through the FSDS is preferably controlled by a flow control means yielding the desired concentration for the desired end use application in which the dispensed fluid is utilized. Such control means may for example comprise a thermal mass flow control (TMFC) device or, alternatively, a fixed orifice located at the inlet of the storage and dispensing vessel to regulate carrier gas flow through the FSDS system, or other efficacious flow control elements and/or assemblies. A TMFC device determines flow fluctuations by sensing heat transfer changes in a heated element placed in the gas stream. TMFC devices are readily commercially available for such purpose, from manufacturers such as Porter, Stec (Division of Horiba Instrument), Unit Instruments, Tylan General, Aera, Brooks Instruments, etc.

The use of a TMFC device as a gas concentration sensor for one component of a two component FSDS ("two component" here referring to a carrier gas as one component, and the sorbable gas being dispensed as the other component) can be accomplished by the TMFC device relating the temperature rise of a slipstream of gas to a desired or pre-determined heat flux set point. With a defined heat capacity ("Cp") of a gas and a defined heat flux ("Q"), the mass flow of a gas being monitored by a TMFC is given by Equation 1:

$$M = \frac{Q}{Cp(T)\Delta T} \quad (1)$$

In a two-component system, the ratio of heat capacities of the sorbable and carrier gases is used to monitor the flow of sorbate gas, assuming a constant flow of carrier gas. For a two-component system Equation 1 is modified to give the following Equation 2:

$$M_1 = \frac{Q}{C_{pl}(T)\Delta T} * \frac{M_2 C_{p2}}{C_{pl}} \quad (2)$$

where $M_1$ represents the flow of the sorbate gas and $M_2$ represents the flow of the carrier gas. Heat capacity data for sorbate gases and inert gases are available in the literature as a function of temperature and pressure conditions. A TMFC can be used to monitor the flow of sorbate gas dispensed from the FSDS by reference to the constant carrier gas flow. Appropriate manipulation of the incoming flow of carrier gas or the temperature of the FSDS by an automated control means can be established to control the sorbate gas concentration and, therefore, the flow rate of dispensing of the sorbate gas.

Under ideal operating conditions, in an illustrative FSDS, the flow of the carrier gas may be approximately 0.1–10 sccm (>95 vol %) at <5 psig from the FSDS vessel, with a nominal operating pressure of 1 psig, or 52 torr gauge. The FSDS vessel is slightly pressurized during W the operation of the carrier gas flow dispensing; however, this nominal pressurization is due mostly to the carrier gas partial pressure rather than that of the sorbate gas. The partial pressure of sorbate species should not exceed atmospheric pressure as defined by the isothermal equilibrium and, in most cases, will be <100 torr. For example, the sorbate gas from a FSDS vessel at a static equilibrium of 50 torr and operated at a pressure of 1 psig, or 812 torr will have a theoretical concentration of no more than 5.8% in the sorbable fluid-containing carrier gas stream. The carrier gas at this concentration can be further diluted to yield a concentration of sorbable fluid in the 50–100 parts-per-million by volume (ppmv) range with the addition of up to 100 standard cubic centimeters per minute (sccm) diluent gas, given the controlled flow of the carrier gas at 0.1 sccm from the FSDS.

The FSDS vessel capacity varies depending upon the particular sorbate gas dispensing requirements. For example, in the case of silicon epitaxy, which requires 50–5000 ppmv gases at 100–200 sccm flows, a "WY" size vessel would provide sufficient yearly capacity when filed to only 50 torr. For other potential applications such as in-situ doped (ISD) polysilicon deposition, FSDS vessel pressures of >100 torr are required. Generally speaking, the use of carrier gas extraction allows for FSDS extraction to below 10 torr (static) of sorbate gas for applications requiring very dilute gas mixtures.

In one particular embodiment, the system comprises:
a storage and dispensing vessel, containing the physical sorbent medium;
a supply tank for holding carrier gas;

first flow passage means joining the supply tank in flow communication with the storage and dispensing vessel;

second flow passage means for discharging carrier gas and desorbed fluid from the storage and dispensing vessel; and flow control means operatively coupled with the second flow passage means, to selectively control flow of fluid from the storage and dispensing vessel through the second flow passage means.

The above-described system may also comprise a motive fluid driver associated with the first and/or second passage means for providing fluid flow therethrough at a predetermined rate. Such motive fluid driver may for example comprise a blower, fan, compressor, ejector, eductor, pump, or any other suitable fluid flow-effecting means. In some instances it will not be necessary to utilize such a fluid driver, as for example where the carrier gas is supplied at a suitably high pressure, or where the overall system is constructed, arranged and operated to provide an overall pressure drop characteristic therethrough which accommodates the desired flow of the carrier gas through the flow passages and the sorbent-containing vessel.

As used herein, the term "flow passage means" is intended to be broadly construed to include any means by which fluid flow is accommodated between the specified locations in the system, including pipes, conduits, channels, passages, lines, tubes, hydraulic circuitry, hoses, manifolds, orifice structures, inlets, plenum chambers, ports, etc.

Other aspects and features of the invention will be more fully apparent from the ensuing disclosure.

DETAILED DESCRIPTION OF THE INVENTION, AND PREFERRED EMBODIMENTS THEREOF

The disclosures of the following U.S. patents and applications are hereby incorporated herein by reference in their entireties:

U.S. Pat. No. 5,518,528 issued May 21, 1996 in the names of Glenn M. Tom and James V. McManus; U.S. patenet application Ser. No. 08/650,634 filed May 20, 1996 in the names of Glenn M. Tom and James V. McManus for "Fluid Storage And Delivery System Utilizing Carbon Sorbent Medium;" U.S. Provisional patent application Ser. No. 60/046,778 filed May 16, 1997 in the names of Glenn M. Tom, Peter S. Kirlin and James V. McManus for "Semiconductor Manufacturing System Utilizing Sorbent-Based Fluid Storage and Dispensing Apparatus and Method for Reagent Delivery;" U.S. patent application Ser. No. 08/650,633 filed May 20, 1996 in the names of Glenn M. Tom, Karl Olander and James V. McManus for "Fluid Storage and Delivery System Comprising High Work Capacity Physical Sorbent;" U.S. patent application Ser. No. 08,742,856 filed Nov. 1, 1996 in the names of Glenn M. Tom and James V. McManus for "Process System With Integrated Gas Storage, and Delivery Unit;" U.S. patent application Ser. No. 08/809,819 filed Apr. 11, 1997 in the name of Glenn M. Tom and James V. McManus for "Storage And Delivery System For Gaseous Compounds;" and U.S. patent application Ser. No. 08/859,172 filed May 20, 1997 in the name of Glenn M. Tom for "High Capacity Gas Storage and Dispensing System."

In the ensuing disclosure, the invention will be described with reference to a gas as the sorbate fluid, however, it will be recognized that the invention is broadly applicable to liquids, gases, vapors, and multiphase fluids, and contemplates storage and dispensing of fluid mixtures as well as single component fluids.

Figure 1:
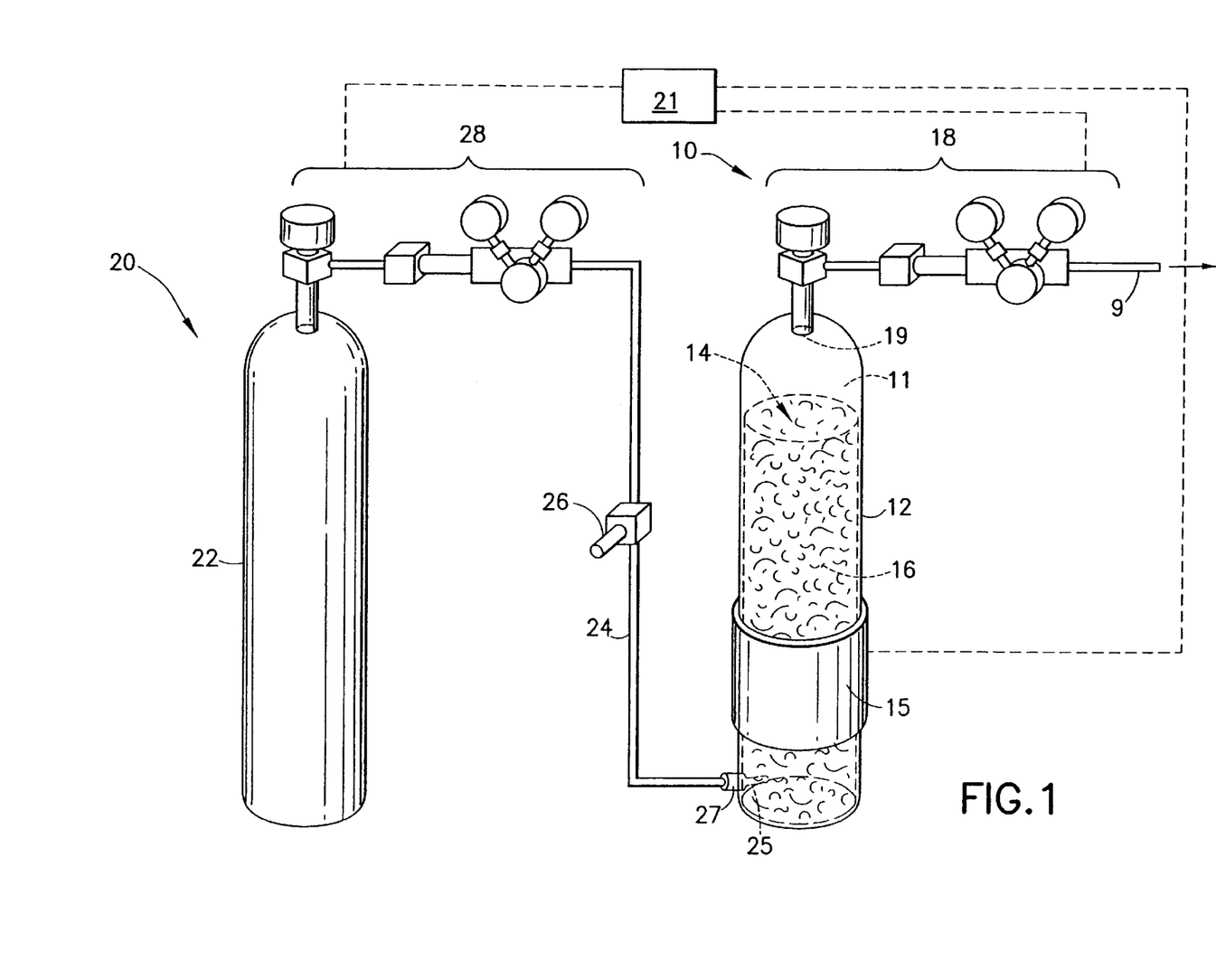
FIG. 1 is a schematic representation of a sorbate fluid storage and dispensing system and carrier gas supply means, including a carrier gas source and associated flow circuitry, according to one embodiment of the invention.

Referring now to the drawings, FIG. 1 is a schematic representation of a storage and dispensing system 10 comprising storage and dispensing vessel 12. The storage and dispensing vessel 12 may for example comprise a conventional gas cylinder container of elongate character, having an aspect ratio of height to diameter which may for example be in the range of from about 3 to about 10. In the interior volume 11 of such vessel 12 is disposed a bed 14 of a suitable sorbent medium 16.

The vessel 12 is provided at its upper end with a conventional cylinder head fluid dispensing assembly 18 leak-tightly coupled with the main body of the dispensing vessel 12 at the port 19. The port 19 allows fluid flow from the interior volume 11 of the cylinder into the dispensing assembly 18. To prevent entrainment of particulate solids in the fluid being dispensed from the cylinder, the port 19 may be provided with a frit, screen, grid or other filtration means therein. A thermal heating jacket 15 is provided for inducing thermal desorption, if desired, but in accordance with the objects of the invention, it is preferred that the desorption of the sorbable fluid from the sorbent material in the vessel be carried out with thermally mediated desorption being kept to a minimum, and most preferably without any heating of the sorbent medium. Thus, the storage and dispensing vessel may be maintained at ambient conditions, e.g., an operating pressure less than 15 psia and a temperature of less than 42° C.

The sorbent medium 16 may comprise any suitable sorptively effective material, having sorptive affinity for the fluid to be stored and subsequently dispensed from the vessel 12, and from which the sorbate fluid is suitably desorbable. Examples include: crystalline aluminosilicate compositions, e.g., a micropore aluminosilicate composition with a pore size in the range of from about 4 to about 13 Å, and/or a mesopore crystalline aluminosilicate composition with a pore size in the range of from about 20 to about 40 Å; carbon sorbent materials, such as bead activated carbon sorbents of highly uniform spherical particle shape, e.g., BAC-MP, BAC-LP, and BAC-G-70R bead carbon materials (Kreha Corporation of America, New York, N.Y.), silica, alumina, macroreticulate polymers, porous silicon, kieselguhr, aluminum phosphate, clay, polymers (including porous polytetrafluoroethylene polymers, macroreticulate polymers and glassy domain polymers), aluminum phosphosilicate, etc.

Preferred sorbent materials in the practice of the invention include zeolites and carbon sorbents.

Preferred forms of carbon sorbent materials include: carbon formed by pyrolysis of synthetic hydrocarbon resins such as polyacrylonitrile, sulfonated polystryrene-divinylbenzene, etc.; cellulosic char; charcoal; and activated carbon formed from natural source materials such as coconut shells, pitch, wood, petroleum, coal, etc.

A preferred carbon sorbent material is activated carbon, a highly sorbent form of carbon produced by heating granulated charcoal to appropriate elevated temperature. Most preferred are the so-called bead carbon forms of activated carbon, where the beads, i.e., highly uniform diameter spherical particles, may have a diameter in the range of from about 0.1 to about 1 centimeter, and more preferably from about 0.25 to about 2 millimeters diameter.

The sorbent material may be suitably processed or treated to ensure that it is devoid of trace components that may deleteriously affect the performance of the fluid storage and dispensing system. For example, the sorbent may be subjected to washing treatment, e.g., with hydrofluoric acid, to render it sufficiently free of trace components such as metals and oxidic transition metal species.

Continuing with reference to FIG. 1, a carrier gas source 20 is provided for the purpose of facilitating dispensing of sorbate fluid from the SFDS. The carrier gas source 20 may be in the form of a pressurized vessel 22 or a generating source of inert gas to provide the carrier gas. The carrier gas is preferably inert in nature and may include nitrogen, helium, argon, etc.

The carrier gas supply source 20 is joined by line 24 to the sorbate gas dispensing vessel 12 through carrier gas entry port 27, thereby establishing gas flow communication of the carrier gas supply source 20 with the dispensing vessel 12. The gas entry port 27 is located at the opposite end of the sorbate fluid dispensing vessel from dispensing port 19 in order to maximize the through-flow effect and the extent of carrier gas contact with the sorbent medium 16.

Means (not shown) may be provided in the vessel, such as nozzles, spargers, distributors, flow spreaders, dispersers, etc., serving to distribute the carrier gas flow in the interior volume of the FSDS vessel, to thereby achieve maximum extraction of the sorbable fluid from the sorbent material in the FSDS vessel and uptake of same in the carrier gas stream.

A carrier gas dispensing assembly 28 in the embodiment shown is associated with means for regulating the flow of the carrier gas from supply source 22 through the FSDS. The carrier gas dispensing assembly 28 may suitably comprise a monitoring and flow regulating means.

The carrier gas dispensing assembly 28 is used to monitor carrier gas flow rate through line 24 into sorbate fluid dispensing vessel 12 via carrier gas insertion tube 25. An isolation valve 26 is provided on line 24 as an alternate means of shutting off carrier gas flow to the sorbate gas dispensing vessel 12. Carrier gas entry port 27 is equipped with a tube coupling means (not shown) to facilitate exchange (change-out) of the carrier gas supply source 20.

Both the carrier gas dispensing assembly 28 and the sorbate fluid dispensing assembly may be controllably linked to a microprocessor 21 or other suitable control means, as shown, for regulating fluid flows depending on the desired sorbate fluid concentrations in the gas mixture of carrier gas and sorbate fluid that is discharged from the vessel through the discharge port 19. An additional microprocessor link may be made to the heating jacket 15, as shown, to effect selective actuation or deactuation of the heating jacket for the purpose of selectively controlling thermal desorption, if and as desired.

The carrier gas stream containing the sorbable fluid entrained therein is discharged from the vessel 12 as shown in FIG. 1 into discharge line 9, which may comprise a conduit, tubing, piping, flow channel, or other flow passage means for dispensing fluid exteriorly of the storage and dispensing vessel. From discharge line 9, the carrier gas mixture may be passed to a downstream locus of use (not shown in FIG. 1), such as an ion implant chamber or doping apparatus or other process system in which the sorbate fluid component of the carrier gas stream is utilized.

Figure 2:
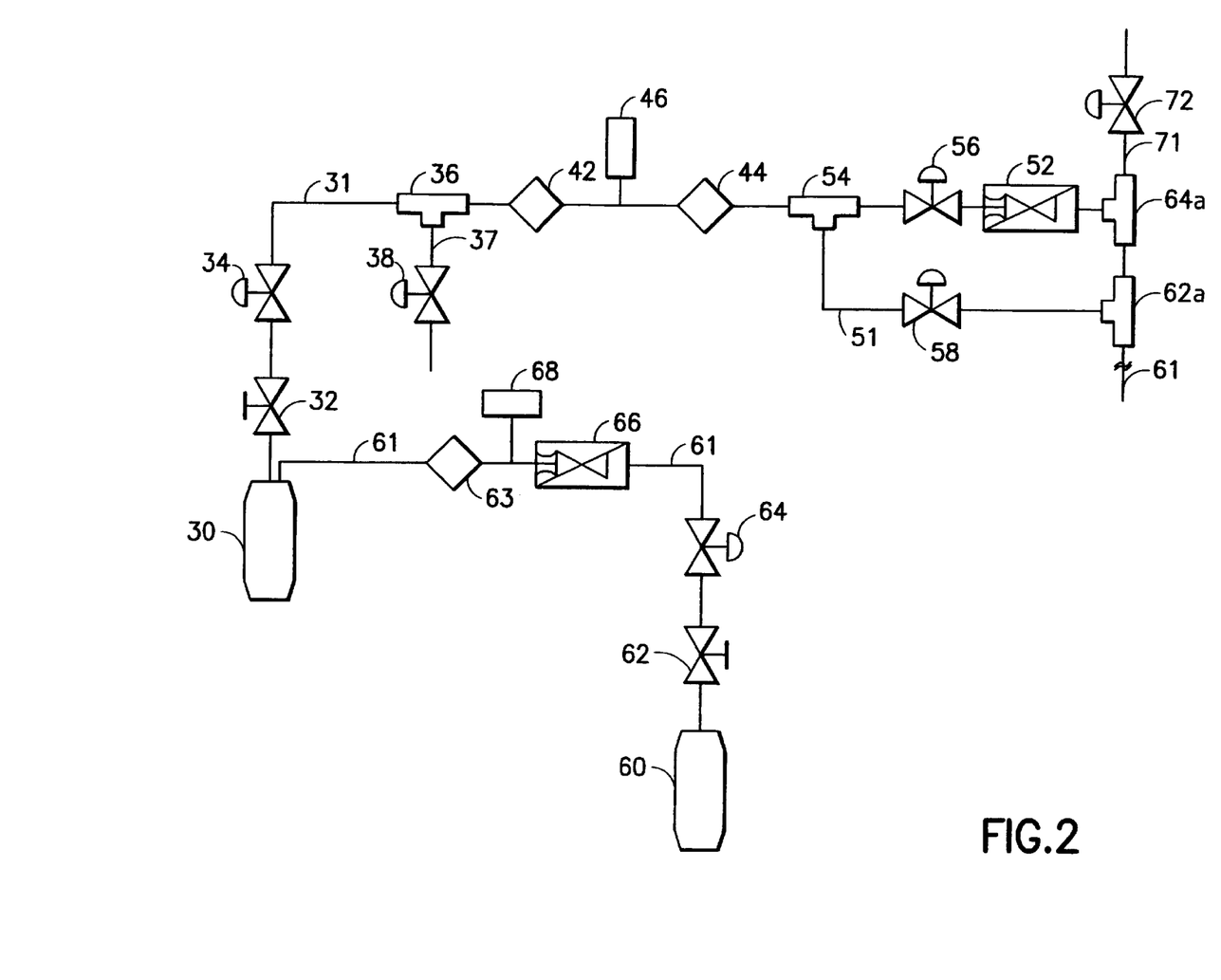
FIG. 2 is a schematic representation of a sorbate fluid storage and dispensing system integrated with a carrier gas supply, showing associated flow circuitry according to another embodiment of the invention.

Referring to FIG. 2, a schematic representation of an SFDS is depicted, according to another embodiment of the invention. The illustrated system includes a carrier gas source 60, which may take the form of a pressurized gas cylinder. A cylinder valve 62 is provided for the carrier gas source 60, for releasing the carrier gas into line 61.

In the event that assisted flow is required in line 61, a pump 68 may be located downstream therefrom. A filter and purifier 63 may be provided for attenuating particulates that may be present from the carrier gas source 60, or which are otherwise generated in the pump 68.

The pump 68 may be of any suitable type, but preferably is a double-stage all-metal sealed diaphragm pump. Such pumps are preferred in the practice of the invention for safety and purity reasons, and are characterized by low leak rates and capability of high pumping speeds.

The carrier gas supply source 60 is joined by line 61 to the storage and dispensing vessel 30, thereby establishing flow communication of the carrier gas supply source 60 with the storage and dispensing vessel 30. The flow of carrier gas through line 61 may be controlled by a flow control means, which may for example comprise a flow control valve 64 and associated fixed orifice or mass flow controller schematically represented by box 66.

Line 61 has disposed therein an absolute pressure regulator 64, a filter and purifier 63, and a fixed orifice or mass flow controller 66, for controllably flowing the carrier gas to the storage and dispensing vessel 30 at a desired process flow rate and pressure appropriate to the end use of the storage and dispensing system.

The purifier 63 downstream from the absolute pressure regulator 64 serves to purify the carrier gas being supplied, to chemisorptively remove any deleterious or unwanted components from the carrier gas stream, e.g., water and oxidants. The purifier 63 also serves to provide filtration of the dispensing fluid stream. The purifier 63 may be of any suitable type, including purifiers commercially available from Millipore Corporation (Bedford, Mass.) under the trademark "Waferpure".

In operation, the storage and dispensing vessel 30, containing the sorbent material which sorptively holds the fluid to be dispensed, is subjected to the introduction of the carrier gas flow from the carrier gas source 60 through line 61. The carrier gas passes through the storage and dispensing vessel 30 causing sorbate gas to pass into the bulk gas phase by the associated concentration gradient. The resulting gas mixture then exits the storage and dispensing vessel via manifold 31.

The dispensing vessel 30 has associated therewith a cylinder valve 32 for controllably releasing the gas mixture from the vessel 30, together with an isolation valve 34 that may be selectively actuated to close gas communication between the dispensing vessel 30 and manifold 31.

The manifold 31 has a branch fitting 36 therein, by means of which manifold is coupled in gas flow communication with a branch purge line 37 having inert gas purge isolation valve 38 therein.

By this arrangement, the manifold may be purged with inert gas, prior to initiating active operation for delivery of gas from dispensing vessel 30.

Downstream from the branch fitting 36, the manifold contains two successive gas filters 42 and 44, intermediate of which is disposed a pressure transducer 46 having a pressure operating range appropriate to the system operation.

The gas manifold 31 is connected downstream of gas filter 44 with a branch fitting 54. A bypass conduit 51 having bypass isolation valve 58 therein is coupled to the branch fitting 54.

The gas manifold 31 downstream of fitting 54 has a gas flow on-off valve 56 therein, downstream of which is disposed a mass flow controller 52 for controllably adjusting the flow rate through manifold 31 of the carrier gas stream comprising the sorbable fluid and the carrier gas.

At its terminus downstream of mass flow controller 52, the manifold 31 is connected by coupling fitting 64a to dispensing line 71 having flow control valve 72 therein. The manifold is also coupled in gas flow communication with bypass line 51 via coupling fitting 62a.

"The dispensing line 71 may be joined to an ion source generating means, downstream from flow control valve 72, or other process equipment or facility for use of the dispensed gas." The other end 61 of dispensing line 71 may be suitably coupled in gas flow communication with another gas dispensing and carrier gas means, as desirable or necessary in a given end use application of the FIG. 2 sorbate fluid storage and dispensing system apparatus.

By the provision of the storage and dispensing system of the character illustratively shown in FIGS. 1 and 2, it is possible to utilize a storage and dispensing system holding sorbable fluid in the vessel at a low pressure, e.g., in the range of for example 50 to 650 Torr, as desirable from a safety and handling standpoint, but at the same time provide on demand a high flow rate of the sorbate fluid from the vessel in the carrier gas stream.

It will be appreciated that the system of the invention may be variously configured and constituted to carry out same in accordance with the broad disclosure herein. For example, referring to FIG. 2, the pressure transducer 46, pump 68, pressure regulator 64, mass flow controllers 66 and 52, and valves 62, 34, 56, 58 and 72, as well as any inlet valve associated with the pump, may all be operatively interconnected in a manual or automatic control system circuit, for controllably operating the storage and dispensing system, to provide dispensed fluid at a predetermined rate, or in accordance with a cyclic demand under the control of suitable cycle timer means.

Further, the carrier gas may be supplied to the storage and dispensing vessel holding the sorbate gas, at an appropriate superatmospheric pressure, so that the pressurized carrier gas provides sufficient flow through the storage and dispensing vessel to avoid the use of pumps or compressors for supply of the carrier gas. The dispensing circuitry associated with the storage and dispensing vessel may include an extractor, eductor, pump (e.g., cryopump), or other means to effect flow in the system, and to draw the carrier gas from the source thereof into the storage and dispensing vessel for flow therethrough to discharge desorbed fluid in the carrier gas stream.

It will be recognized that the system of the invention may be widely varied, to provide a flow-through of carrier gas, for achieving desorption of the sorbate from the sorbent material in the storage and dispensing vessel and entrainment of the desorbate gas in the carrier gas stream.

Thus, while the invention has been shown and described with reference to specific features, aspects and embodiments herein, it will be appreciated that the invention is susceptible of a wide variety of other embodiments, features and implementations consistent with the disclosure herein, and the invention and claims hereafter set forth are therefore to be broadly construed and interpreted, within the spirit and scope of the foregoing disclosure.

What is claimed is:

1. A process for delivering a sorbate fluid from a sorbate fluid storage and dispensing system, comprising the steps of:

providing a storage and dispensing vessel with an interior volume containing a solid-phase physical sorbent medium having a sorptive affinity for the sorbate fluid, with the sorbate fluid being sorbed onto the sorbent medium; and flowing a carrier gas through the storage and dispensing vessel to desorb the sorbate fluid from the sorbent medium and discharge from the storage and dispensing vessel a sorbate fluid/carrier gas mixture.

2. A process according to claim 1, comprising selectively controlling the concentration of the sorbate gas in the sorbate gas/carrier gas mixture discharged from the storage and dispensing vessel, by controlling flow rate of the carrier gas flowed through the storage and dispensing vessel.

3. A process for delivery of a sorbate fluid from a sorbate fluid storage and dispensing system to a sorbate fluid-consuming system, said process comprising:

providing a storage and dispensing vessel having an interior volume containing a solid-phase physical sorbent medium having a sorptive affinity for the sorbate fluid, and sorbate fluid sorbed on the sorbent medium;

flowing a carrier gas through the interior volume of the storage and dispensing vessel to desorb the sorbate fluid and form a sorbate fluid/carrier gas mixture;

dispensing said gas mixture from the storage and dispensing vessel; and monitoring the sorbate fluid/carrier gas mixture and responsively dispensing said sorbate fluid from the storage and dispensing vessel at a rate and/or in an amount maintaining a predetermined characteristic of the sorbate fluid/carrier gas mixture.

4. A process according to claim 3, wherein said predetermined characteristic is selected from the group consisting of pressure, temperature, composition, rate of desorption of the sorbate fluid from the sorbent material, concentration gradient, and combinations thereof.

5. A process according to claim 3, wherein a sorbate fluid analyzer is utilized for monitoring the sorbate fluid/carrier gas mixture.

6. A process according to claim 3, comprising monitoring the sorbate fluid/carrier gas mixture and responsively dispensing said sorbate fluid from the storage and dispensing vessel, by use of a carrier gas flow regulating means selected from the group consisting of: flow valves; mass flow controllers; cycle timers; metering assemblies; valved manifolds coupled to a multiplicity of carrier gas components for make up of a multicomponent carrier gas; selectively actuatable bypass piping arrangements; and carrier gas source valve head regulator assemblies.

7. A process according to claim 3, comprising monitoring the sorbate fluid/carrier gas mixture by use of a thermal mass flow control device.

8. A process according to claim 7, wherein the thermal mass flow control device is constructed and arranged to monitor the flow rate of the sorbate fluid dispensed from the storage and dispensing vessel and to maintain a predetermined concentration of the sorbate fluid in the sorbate fluid/carrier gas mixture against a constant flow of carrier gas, by varying the flow rate of the sorbate fluid, in accordance with the equation:

$$M_1 = (Q/(C_{p1}(T)\Delta T)) \times (M_2 C_{p2}/C_{p1})$$

wherein:

$M_1$ is the flow rate of the sorbate fluid;

$M_2$ is the flow rate of the carrier gas;

Q is the heat flux measured by the thermal mass flow control device for the sorbate fluid in the sorbate fluid/carrier gas mixture;

$C_{p1}$ is the heat capacity of the sorbate fluid;

$Cp_2$ is the heat capacity of the carrier gas;

T is the heated temperature of the thermal mass flow control device; and

ΔT is the heated/unheated temperature differential associated with the thermal mass flow control device.

9. A process according to claim 3, comprising monitoring the flow rate of the sorbate fluid dispensed from the storage and dispensing vessel and maintaining a predetermined concentration of the sorbate fluid in the sorbate fluid/carrier gas mixture against a constant flow of carrier gas, by varying the flow rate of the sorbate fluid.

10. A process according to claim 3, comprising monitoring the sorbate fluid/carrier gas mixture and responsively dispensing said sorbate fluid from the storage and dispensing vessel at a rate and/or in an amount maintaining a predetermined characteristic of the sorbate fluid/carrier gas mixture, by use of a device selected from the group consisting of Fourier transform infrared spectrometry monitors, ultrasonic monitors, and piezoelectric quartz crystal microbalance monitors.

11. A process according to claim 3, comprising monitoring the sorbate fluid/carrier gas mixture and responsively dispensing said sorbate fluid from the storage and dispensing vessel at a rate and/or in an amount maintaining (1) a flow of carrier gas from the storage and dispensing vessel in the range of from about 0.1 to about 200 standard cubic feet per minute, and (2) a subatmospheric partial pressure of the sorbate fluid in the sorbate fluid/carrier gas mixture.

12. A process according to claim 3, comprising monitoring the sorbate fluid/carrier gas mixture and responsively dispensing said sorbate fluid from the storage and dispensing vessel at a rate and/or in an amount maintaining a concentration of from 50 to 5000 parts per million by volume of sorbate fluid in the sorbate fluid/carrier gas mixture.

13. A process according to claim 3, wherein the sorbate fluid comprises silane.

14. A process according to claim 3, wherein the sorbate fluid comprises arsine or phosphine.

15. A process according to claim 3, wherein the storage and dispensing vessel comprises a WY size gas cylinder.

16. A process according to claim 3, wherein the gas mixture from the storage and dispensing vessel is flowed to a semiconductor manufacturing unit.

17. A process according to claim 16, wherein the semiconductor manufacturing unit comprises a silicon epitaxy unit.

18. A process according to claim 16, wherein the semiconductor manufacturing unit comprises an ion implant chamber.

19. A process according to claim 16, wherein the semiconductor manufacturing unit comprises a doping apparatus.

20. A process according to claim 3, conducted to maintain a pressure of the sorbable fluid in the storage and dispensing vessel of from about 50 to about 650 Torr in the absence of the carrier gas flow from the carrier gas source through the interior volume of the storage and dispensing vessel.

21. A process according to claim 3, wherein the carrier gas is selected from the group consisting of hydrogen, argon, helium, nitrogen, and mixtures thereof.

22. A process according to claim 3, wherein the gas mixture from the storage and dispensing vessel is flowed to a chemical vapor deposition unit.

23. A process according to claim 3, wherein each of the sorbate fluid and the carrier gas comprises a different organometallic precursor.

24. An apparatus for storage and dispensing of a sorbate fluid, comprising:

a storage and dispensing vessel having an interior volume containing a solid-phase physical sorbent medium and a sorbate fluid, the sorbent medium having a sorptive affinity for the sorbate fluid, and the storage and dispensing vessel having a discharge port for discharge of sorbate fluid from the vessel;

a carrier gas source coupled in gas flow communication with the interior volume of the storage and dispensing vessel;

means for flowing a carrier gas from the carrier gas source through the interior volume of the storage and dispensing vessel to yield a sorbate fluid/carrier gas mixture; and means for dispensing said gas mixture from the storage and dispensing vessel.

25. An apparatus according to claim 24, wherein the storage and dispensing vessel is maintained at ambient temperature and pressure conditions.

26. An apparatus according to claim 25 wherein the carrier gas from the carrier gas source comprises a carrier gas species selected from the group consisting of hydrogen, helium, argon, nitrogen and mixtures of two or more of the foregoing.

27. An apparatus according to claim 1 wherein the carrier gas source is coupled in gas flow communication with the storage and dispensing vessel by a gas entry port of the storage and dispensing vessel.

28. An apparatus according to claim 27, wherein the gas entry port is located on the storage and dispensing vessel in spaced-apart relationship to the discharge port.

29. An apparatus according to claim 27, wherein said means for flowing the carrier gas through the storage and dispensing vessel comprise a carrier gas pump.

30. An apparatus according to claim 27, wherein said means for flowing the carrier gas through the storage and dispensing vessel comprise a pressurized tank wherein the carrier gas is stored.

31. An apparatus according to claim 24, which is devoid of means for heating the sorbent medium.

32. An apparatus according to claim 24 wherein said storage and dispensing vessel is operated substantially at atmospheric pressure.

33. An apparatus according to claim 24 wherein said storage and dispensing vessel is operated at a pressure in the interior volume of the vessel in the range of from about 50 to about 850 torr.

34. An apparatus for delivering a sorbate gas, comprising:

a storage and dispensing vessel having an interior volume containing said sorbate gas and a physical sorbent medium having a sorptive affinity for the sorbate gas, so that at least a portion of the sorbate gas is sorptively held by the physical sorbent medium, with the storage and dispensing vessel having a discharge port for discharging the sorbate gas;

means for introducing into the interior volume of said storage and dispensing vessel a carrier gas, to form a sorbate gas/carrier gas mixture;

means for discharging the sorbate gas/carrier gas mixture from the storage and dispensing vessel; and means for selectively controlling concentration of the sorbate gas in the sorbate gas/carrier gas mixture discharged from the storage and dispensing vessel.

35. An apparatus according to claim 34, wherein the storage and dispensing vessel is maintained at ambient pressure and temperature conditions.

36. An apparatus according to claim 35, wherein the means for controlling the flow rate of the carrier gas entering the storage and dispensing vessel comprise a mass flow controller.

37. An apparatus according to claim 36, wherein the mass flow controller selectively controls the flow rate of the carrier gas as a function of a predetermined sorbate gas concentration in the sorbate gas/carrier gas mixture discharged from the storage and dispensing vessel.

38. An apparatus according to claim 35, wherein the means for controlling the flow rate of the carrier gas entering the storage and dispensing vessel comprise an orifice element through which the carrier gas is flowed prior to entering the storage and dispensing vessel.

39. An apparatus according to claim 38, wherein the orifice element is selectively variable to control the flow rate of the carrier gas as a function of a predetermined sorbate gas concentration in the sorbate gas/carrier gas mixture discharged from the storage and dispensing vessel.

40. An apparatus according to claim 34, wherein the means for selectively controlling the concentration of the sorbate gas in the sorbate gas/carrier gas mixture discharged from the storage and dispensing vessel control the flow rate of the carrier gas entering the storage and dispensing vessel.

41. An apparatus according to claim 34, wherein the means for selectively controlling concentration of the sorbate gas in the sorbate gas/carrier gas mixture discharged from the storage and dispensing vessel comprise means for regulating the temperature of the sorbent medium in the storage and dispensing vessel.

42. An apparatus for storage and dispensing of a sorbate fluid, comprising:
- a storage and dispensing vessel having an interior volume containing a solid-phase physical sorbent medium and a sorbate fluid, the sorbent medium having a sorptive affinity for the sorbate fluid, and the storage and dispensing vessel having a discharge port for discharge of sorbate fluid from the vessel;
- a carrier gas source coupled in gas flow communication with the interior volume of the storage and dispensing vessel;
- means for flowing a carrier gas from the carrier gas source through the interior volume of the storage and dispensing vessel to yield a sorbate fluid/carrier gas mixture;
- means for dispensing said gas mixture from the storage and dispensing vessel; and
- means for monitoring the sorbate fluid/carrier gas mixture and responsively dispensing said sorbate fluid from the storage and dispensing vessel at a rate and/or in an amount maintaining a predetermined characteristic of the sorbate fluid/carrier gas mixture.

43. An apparatus according to claim 42, wherein said predetermined characteristic is selected from the group consisting of pressure, temperature, composition, rate of desorption of the sorbate fluid from the sorbent material, concentration gradient, and combinations thereof.

44. An apparatus according to claim 42, wherein said means for monitoring the sorbate fluid/carrier gas mixture and responsively dispensing said sorbate fluid from the storage and dispensing vessel, comprise a sorbate fluid analyzer.

45. An apparatus according to claim 42, wherein said means for monitoring the sorbate fluid/carrier gas mixture and- responsively dispensing said sorbate fluid from the storage and dispensing vessel, comprise a carrier gas flow regulating means selected from the group consisting of: flow valves; mass flow controllers; cycle timers; metering assemblies; valved manifolds coupled to a multiplicity of carrier gas components for make up of a multicomponent carrier gas; selectively actuatable bypass piping arrangements; and carrier gas source valve head regulator assemblies.

46. An apparatus according to claim 42, wherein said means for monitoring the sorbate fluid/carrier gas mixture and responsively dispensing said sorbate fluid from the storage and dispensing vessel at a rate and/or in an amount maintaining a predetermined characteristic of the sorbate fluid/carrier gas mixture, comprise a thermal mass flow control device.

47. An apparatus according to claim 46, wherein the thermal mass flow control device is constructed and arranged to monitor the flow rate of the sorbate fluid dispensed from the storage and dispensing vessel and to maintain a predetermined concentration of the sorbate fluid in the sorbate fluid/carrier gas mixture against a constant flow of carrier gas, by varying the flow rate of the sorbate fluid.

48. An apparatus according to claim 46, wherein the thermal mass flow control device is constructed and arranged to monitor the flow rate of the sorbate fluid dispensed from the storage and dispensing vessel and to maintain a predetermined concentration of the sorbate fluid in the sorbate fluid/carrier gas mixture against a constant flow of carrier gas, by varying the flow rate of the sorbate fluid, in accordance with the equation:

$$M_1 = (Q/(C_{p1}(T)\Delta T)) \times (M_2 C_{p2}/C_{p1})$$

wherein:
- $M_1$ is the flow rate of the sorbate fluid;
- $M_2$ is the flow rate of the carrier gas;
- $Q$ is the heat flux measured by the thermal mass flow control device for the sorbate fluid in the sorbate fluid/carrier gas mixture;
- $C_{p1}$ is the heat capacity of the sorbate fluid;
- $C_{p2}$ is the heat capacity of the carrier gas;
- $T$ is the heated temperature of the thermal mass flow control device; and
- $\Delta T$ is the heated/unheated temperature differential associated with the thermal mass flow control device.

49. An apparatus according to claim 42, wherein the means for monitoring the sorbate fluid/carrier gas mixture and responsively dispensing said sorbate fluid from the storage and dispensing vessel at a rate and/or in an amount maintaining a predetermined characteristic of the sorbate fluid/carrier gas mixture, comprise a device selected from the group consisting of Fourier transform infrared spectrometry monitors, ultrasonic monitors, and piezoelectric quartz crystal microbalance monitors.

50. An apparatus according to claim 42, wherein the means for monitoring the sorbate fluid/carrier gas mixture and responsively dispensing said sorbate fluid from the storage and dispensing vessel at a rate and/or in an amount maintaining a predetermined characteristic of the sorbate fluid/carrier gas mixture, are constructed and arranged to maintain (1) a flow of carrier gas from the storage and dispensing vessel in the range of from about 0.1 to about 200 standard cubic feet per minute, and (2) a subatmospheric partial pressure of the sorbate fluid in the sorbate fluid/carrier gas mixture.

51. An apparatus according to claim 42, wherein the means for monitoring the sorbate fluid/carrier gas mixture and responsively dispensing said sorbate fluid from the storage and dispensing vessel at a rate and/or in an amount maintaining a predetermined characteristic of the sorbate fluid/carrier gas mixture, are constructed and arranged to maintain a concentration of from 50 to 5000 parts per million by volume of sorbate fluid in the sorbate fluid/carrier gas mixture.

52. An apparatus according to claim 42, wherein the sorbate fluid comprises silane.

53. An apparatus according to claim 42, wherein the sorbate fluid comprises arsine or phosphine.

54. An apparatus according to claim 42, wherein the storage and dispensing vessel comprises a WY size gas cylinder.

55. An apparatus according to claim 42, wherein the means for dispensing said gas mixture from the storage and dispensing vessel, are joined in gas mixture feed relationship to a semiconductor manufacturing unit.

56. An apparatus according to claim 55, wherein the semiconductor manufacturing unit comprises a silicon epitaxy unit.

57. An apparatus according to claim 55, wherein the semiconductor manufacturing unit comprises an ion implant chamber.

58. An apparatus according to claim 55, wherein the semiconductor manufacturing unit comprises a doping apparatus.

59. An apparatus according to claim 42, constructed and arranged to maintain a pressure of the sorbable fluid in the storage and dispensing vessel of from about 50 to about 650 Torr in the absence of the carrier gas flow from the carrier gas source through the interior volume of the storage and dispensing vessel to yield the sorbate fluid/carrier gas mixture.

60. An apparatus according to claim 42, wherein the carrier gas is selected from the group consisting of hydrogen, argon, helium, nitrogen, and mixtures thereof.

61. An apparatus according to claim 42, wherein the means for dispensing said gas mixture from the storage and dispensing vessel, are joined in gas mixture feed relationship to a chemical vapor deposition unit.

62. An apparatus according to claim 42, wherein each of the sorbate fluid and the carrier gas comprises a different organometallic precursor.

* * * * *

UNITED STATES PATENT AND TRADEMARK OFFICE
CERTIFICATE OF CORRECTION

PATENT NO : 5,980,608

DATED : Nov. 9, 1999

INVENTOR(S) : James Dietz and James V. McManus

It is certified that error appears in the above-identified patent and that said Letters Patent are hereby corrected as shown below:

| | |
|---|---|
| Column 1, line 28: | change "±30°C" to --+30°C--. |
| Column 1, line 48: | change "TQm" to --Tom--. |
| Column 2, line 66: | Change "fmish" to --finish--. |
| Column 3, line 19: | change "sorbatel" to --sorbate--. |
| Column 4, line 54: | Change "Nos." to --No.--. |
| Column 6, line 37: | after "during" delete "W". |
| Column 7, line 50: | change "patenet" to --patent--. |
| Column 7, line 63: | change "08,742,856" to --08/742,856--. |
| Column 11, line 11: | before "The" delete """. |
| Column 11, line 14: | after "gas." delete """. |
| Column 13, line 66-67: | change "orga-nometallic" to --organ-ometallic--. |
| Column 14, line 26: | change "1" to --24--. |
| Column 15, line 65: | after "and" delete "-". |

Signed and Sealed this

Tenth Day of April, 2001

NICHOLAS P. GODICI

*Attest:*

*Attesting Officer*    Acting Director of the United States Patent and Trademark Office